(12) United States Patent
Zhang et al.

(10) Patent No.: US 8,475,115 B2
(45) Date of Patent: *Jul. 2, 2013

(54) PRE-FILTRATION BYPASS FOR GAS TURBINE INLET FILTER HOUSE

(75) Inventors: Jianmin Zhang, Greer, SC (US); Brad Aaron Kippel, Greer, SC (US)

(73) Assignee: General Electric Company, Schenectady, NY (US)

( * ) Notice: Subject to any disclaimer, the term of this patent is extended or adjusted under 35 U.S.C. 154(b) by 674 days.

This patent is subject to a terminal disclaimer.

(21) Appl. No.: 12/792,102

(22) Filed: Jun. 2, 2010

(65) Prior Publication Data
US 2011/0299973 A1  Dec. 8, 2011

(51) Int. Cl.
F04D 29/70  (2006.01)
(52) U.S. Cl.
USPC .......................................... 415/121.2
(58) Field of Classification Search
USPC .......................................... 415/121.2
See application file for complete search history.

(56) References Cited

U.S. PATENT DOCUMENTS

| | | |
|---|---|---|
| 4,312,645 A | 1/1982 | Mavros et al. |
| 4,416,111 A | 11/1983 | Lenahan et al. |
| 4,698,078 A | 10/1987 | Mavros |
| 5,002,121 A | 3/1991 | von Erichsen |
| 5,057,129 A | 10/1991 | Kierzkowski et al. |
| 5,279,358 A | 1/1994 | Hannis |
| 5,297,173 A | 3/1994 | Hikmet et al. |
| 6,123,751 A | 9/2000 | Nelson et al. |
| 6,875,256 B2 | 4/2005 | Gillingham et al. |
| 7,007,484 B2 | 3/2006 | Stegmaier et al. |
| 7,297,173 B2 | 11/2007 | Renwart et al. |
| 2007/0294984 A1 | 12/2007 | Chiller et al. |
| 2011/0083419 A1 | 4/2011 | Upadhyay et al. |
| 2011/0138767 A1* | 6/2011 | Draper et al. ................ 60/39.52 |

FOREIGN PATENT DOCUMENTS

DE  102007059488 A1  6/2008

OTHER PUBLICATIONS

Search Report issued Sep. 26, 2011 in corresponding EP Application No. 111688364.5.

* cited by examiner

Primary Examiner — Richard Edgar
(74) Attorney, Agent, or Firm — Armstrong Teasdale LLP

(57) ABSTRACT

An inlet filter house is provided for use with a turbine engine including an inlet duct. The inlet filter house is coupled to the inlet duct and includes an inlet hood including a filter assembly selectively positionable between an operating position and a bypass position. An actuating assembly is coupled to the filter assembly to selectively position the filter assembly. A sensor is configured to detect at least one operating parameter. A controller is coupled to the sensor for actuating the actuating assembly based on the at least one operating parameter.

20 Claims, 3 Drawing Sheets

PRE-FILTRATION BYPASS FOR GAS TURBINE INLET FILTER HOUSE

BACKGROUND OF THE INVENTION

The present invention relates generally to turbine engines and, more specifically, to filtration systems for used with turbine engines.

At least some known turbine engines include inlet filter houses that include filter assemblies that remove moisture and particulate matter, such as dust and/or debris, from air channeled to the turbine engine and, more specifically, a compressor. During normal operating conditions, it is desired to channel air through the inlet filter house with minimal air disruption and/or drop in pressure. However, when excessive dust and/or debris is captured within at least some known filter assemblies, the air flow may be disrupted and/or the pressure may drop to a level that adversely affects the performance of the turbine engine. Moreover, in at least some climates, moisture may also disrupt the air flow and/or cause a pressure drop to increase for at least some filter elements. For example, the moisture may cause contaminants on the filter assemblies to swell and/or the moisture may promote ice formation on the filter assemblies. In addition, to adversely effective turbine engine performance, such excessive loading may also reduce a useful life of known filter assemblies.

In addition, over time, the pressure drop across known filter assemblies may increase to a level that severely reduces the amount of air flow to the compressor. In at least some instances, the reduced air flow may cause a compressor surge that may damage the compressor. To prevent compressor surges, at least some known filter assemblies are routinely removed from service and cleaned in what may be a time-consuming and laborious task. Moreover, such a removal process may require the shutdown of the turbine engine for a typical period of three to four days or more.

BRIEF DESCRIPTION OF THE INVENTION

In one embodiment, a method is provided for assembling an inlet filter house for use with a turbine engine. The method includes coupling an inlet hood within an inlet of the turbine engine. The inlet hood includes a filter assembly that is selectively positionable between an operating position and a bypass position. An actuating assembly is coupled to the filter assembly to selectively position the filter assembly. At least one sensor is coupled to detect at least one operating parameter within the turbine engine. A controller is coupled to the sensor to selectively actuate the actuating assembly based on the at least one operating parameter.

In another embodiment, an inlet filter house is provided for use with a turbine engine. The inlet filter house includes an inlet hood including a filter assembly selectively positionable between an operating position and a bypass position. An actuating assembly is coupled to the filter assembly to selectively position the filter assembly. A sensor is configured to detect at least one operating parameter. A controller is coupled to the sensor for actuating the actuating assembly based on the at least one operating parameter.

In yet another embodiment, a turbine engine is provided. The turbine engine includes an inlet duct and an inlet filter house coupled to the inlet duct. The inlet filter house includes a filter assembly selectively positionable between an operating position and a bypass position. An actuating assembly is coupled to the filter assembly to selectively position the filter assembly. A sensor is configured to detect at least one operating parameter. A controller is coupled to the sensor for actuating the actuating assembly based on the at least one operating parameter.

DETAILED DESCRIPTION OF THE INVENTION

The exemplary methods and systems described herein overcome the disadvantages of known inlet filter houses by providing a pre-filtration bypass system that is operable based on ambient conditions. More specifically, the embodiments described herein facilitate selectively bypassing a filter assembly during predetermined operating periods to facilitate increasing an operating efficiency of the turbine engine. Additionally, the exemplary embodiments described herein enable the filter assembly to be selectively bypassed without the filter assembly being manually removed from service.

An exemplary technical effect of the methods and systems described herein includes at least one of: (a) detecting at least one parameter; (b) communicating the at least one parameter; (c) determining a position for a filter assembly based on the at least one parameter; (d) communicating an operating command to move the filter assembly; and (e) maintaining a parameter matrix including a plurality of footprints based on the at least one parameter.

Figure 1:
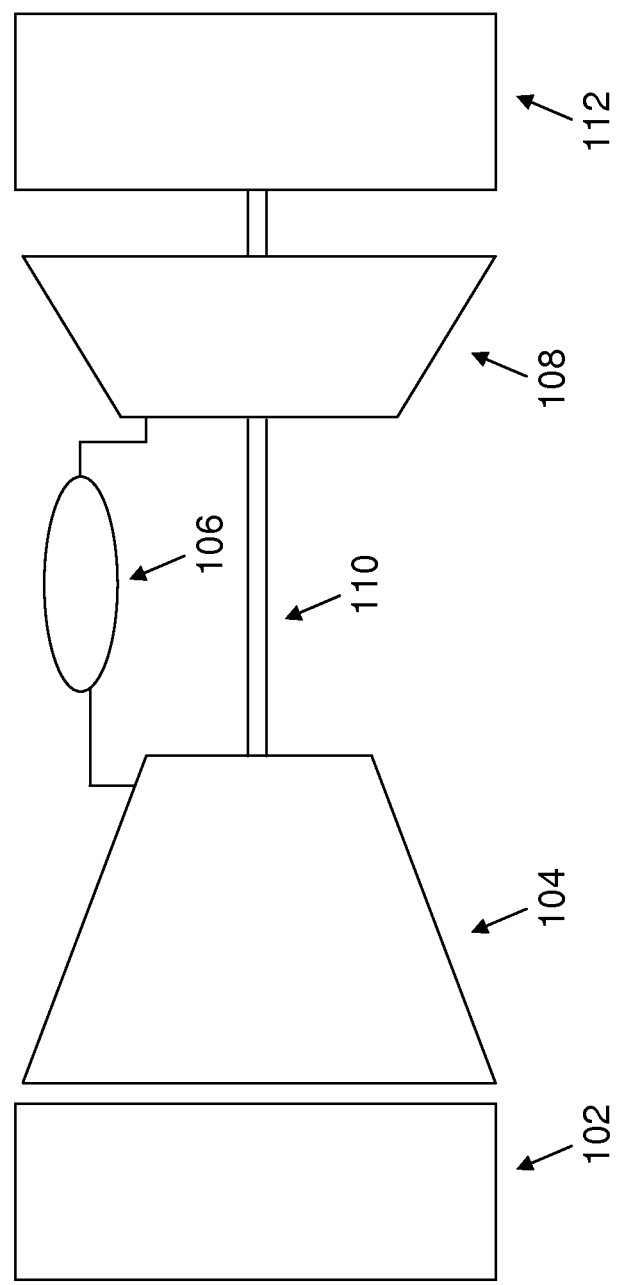
FIG. 1 is a schematic illustration of an exemplary gas turbine engine system.

FIG. 1 is a schematic diagram of an exemplary gas turbine engine system 100. In the exemplary embodiment, gas turbine engine system 100 includes, coupled in serial flow arrangement, an inlet filter house 102, a compressor 104, a combustor assembly 106, and a turbine 108 that is rotatably coupled to compressor 104 via a rotor shaft 110.

During operation, in the exemplary embodiment, ambient air flows into inlet filter house 102, wherein the ambient air is filtered. In the exemplary embodiment, the filtered air is channeled through an air inlet (not shown) towards compressor 104, wherein the filtered air is compressed prior to being discharged towards combustor assembly 106. In the exemplary embodiment, the compressed air is mixed with fuel, and the resulting fuel-air mixture is ignited within combustor assembly 106 to generate combustion gases that flow towards turbine 108. In the exemplary embodiment, turbine 108 extracts rotational energy from the combustion gases and rotates rotor shaft 110 to drive compressor 104. Moreover, in the exemplary embodiment, gas turbine engine system 100 drives a load 112, such as a generator, coupled to rotor shaft 110.

Figure 2:
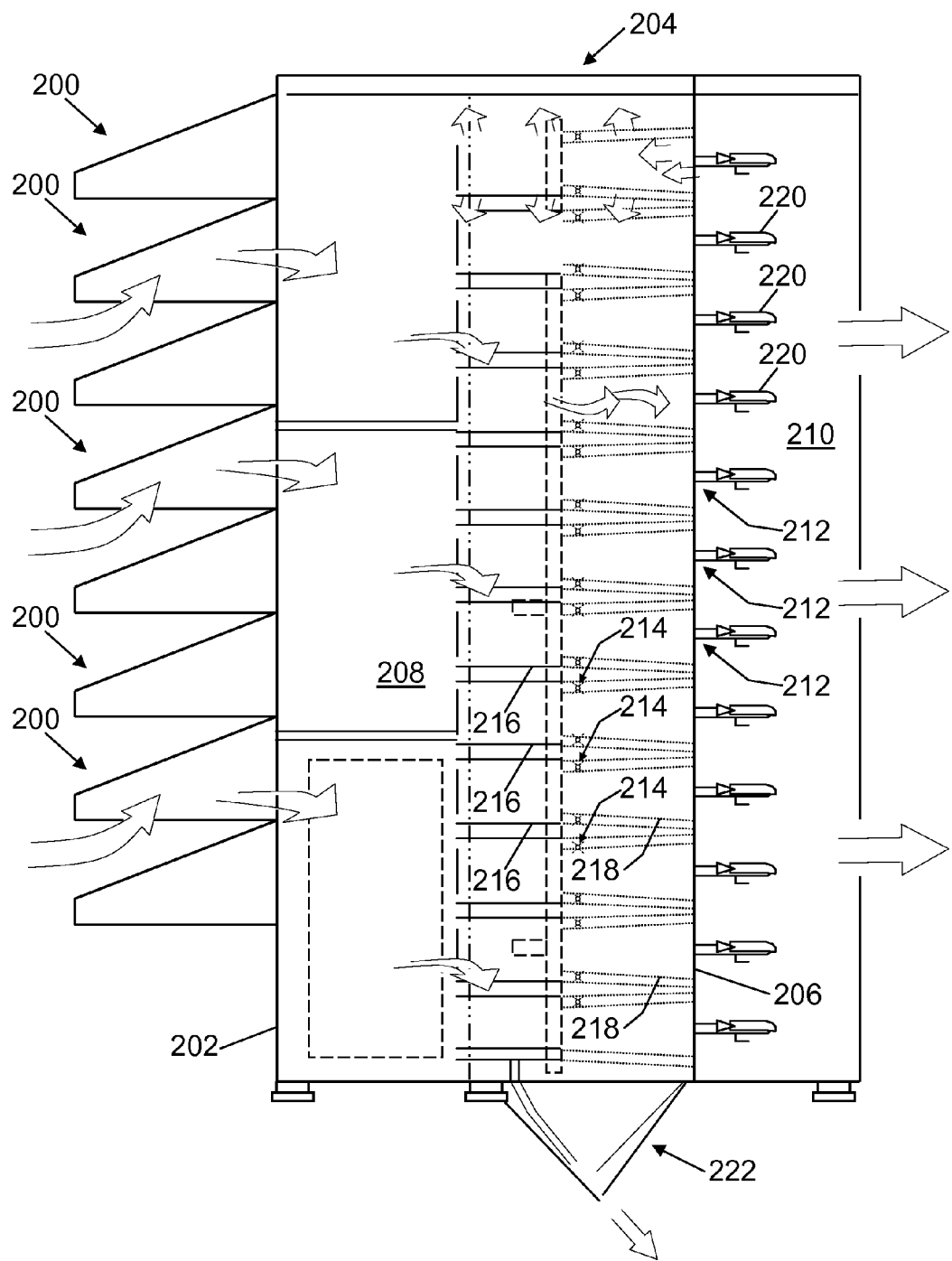
FIG. 2 is a cross-sectional view of an exemplary inlet filter house that may be used with the turbine engine shown in FIG. 1.

FIG. 2 is a cross-sectional view of inlet filter house 102. In the exemplary embodiment, inlet filter house 102 includes a plurality of vertically-spaced inlet hoods 200 that are described in more detail hereinbelow. More specifically, in the exemplary embodiment, inlet hoods 200 are coupled to an outer wall 202 of an air filter enclosure 204, such that air filter enclosure 204 is in flow communication with ambient air via inlet hoods 200.

In the exemplary embodiment, air filter enclosure 204 includes a filter grid tubesheet 206 that defines, within air filter enclosure 204, an air filter chamber 208 that is upstream from tubesheet 206 and a clean air chamber 210 that is downstream from tubesheet 206. In the exemplary embodiment, tubesheet 206 includes a plurality of apertures 212 extending therethrough that couple air filter chamber 208 in flow communication with clean air chamber 210.

In the exemplary embodiment, a plurality of filter cartridges 214 are coupled to an upstream side of tubesheet 206 within air filter chamber 208. More specifically, in the exemplary embodiment, each aperture 212 is sized, shaped, and oriented to receive a corresponding filter cartridge 214 such that air filter chamber 208 is coupled in flow communication with clean air chamber 210 via filter cartridges 214. In the exemplary embodiment, each filter cartridge 214 includes a cylindrical portion 216 and a conical portion 218 that extends from cylindrical portion 216. Alternatively, filter cartridge 214 may be a single filter element and/or may have any shape that enables filter house 102 to function as described herein. Moreover, in the exemplary embodiment, filter cartridge 214 are all identical. Alternatively, any number, shape, or orientation of filter cartridges 214 may be used that enables filter house 102 to function as described herein.

In the exemplary embodiment, a plurality of compressed air pulse cleaners 220 are coupled to a downstream side of tubesheet 206 within clean air chamber 210. More specifically, in the exemplary embodiment, each compressed air pulse cleaner 220 is oriented to direct jet air through a corresponding aperture 212 and/or filter cartridge 214. For example, during cleaning of filter cartridges 214, compressed air pulse cleaners 220 pulse a flow of air through apertures 212 to create a shockwave that facilitates removing particulate matter, such as dust and/or debris, from filter cartridges 214. In the exemplary embodiment, a collection hopper 222 is coupled to air filter chamber 208 to collect and/or remove dust and/or debris that settles within air filter chamber 208.

During operation, in the exemplary embodiment, ambient air is channeled through inlet hoods 200 to air filter enclosure 204. In the exemplary embodiment, at least some dust and/or debris entrained in the air entering air filter enclosure 204 falls into collection hopper 222 by gravity. Moreover, in the exemplary embodiment, filter cartridges 214 remove at least some dust and/or debris carried by air channeled through air filter chamber 208. In the exemplary embodiment, filtered air is then channeled downstream through apertures 212 and into clean air chamber 210 prior to being channeled to compressor 104 (shown in FIG. 1). To facilitate removing dust and/or debris from filter cartridges 214, in the exemplary embodiment, compressed air pulse cleaners 220 pulse a flow of jet air through apertures 212 and/or filter cartridges 214. The dust and/or debris removed from filter cartridges 214 falls into collection hopper 222.

Figure 3:
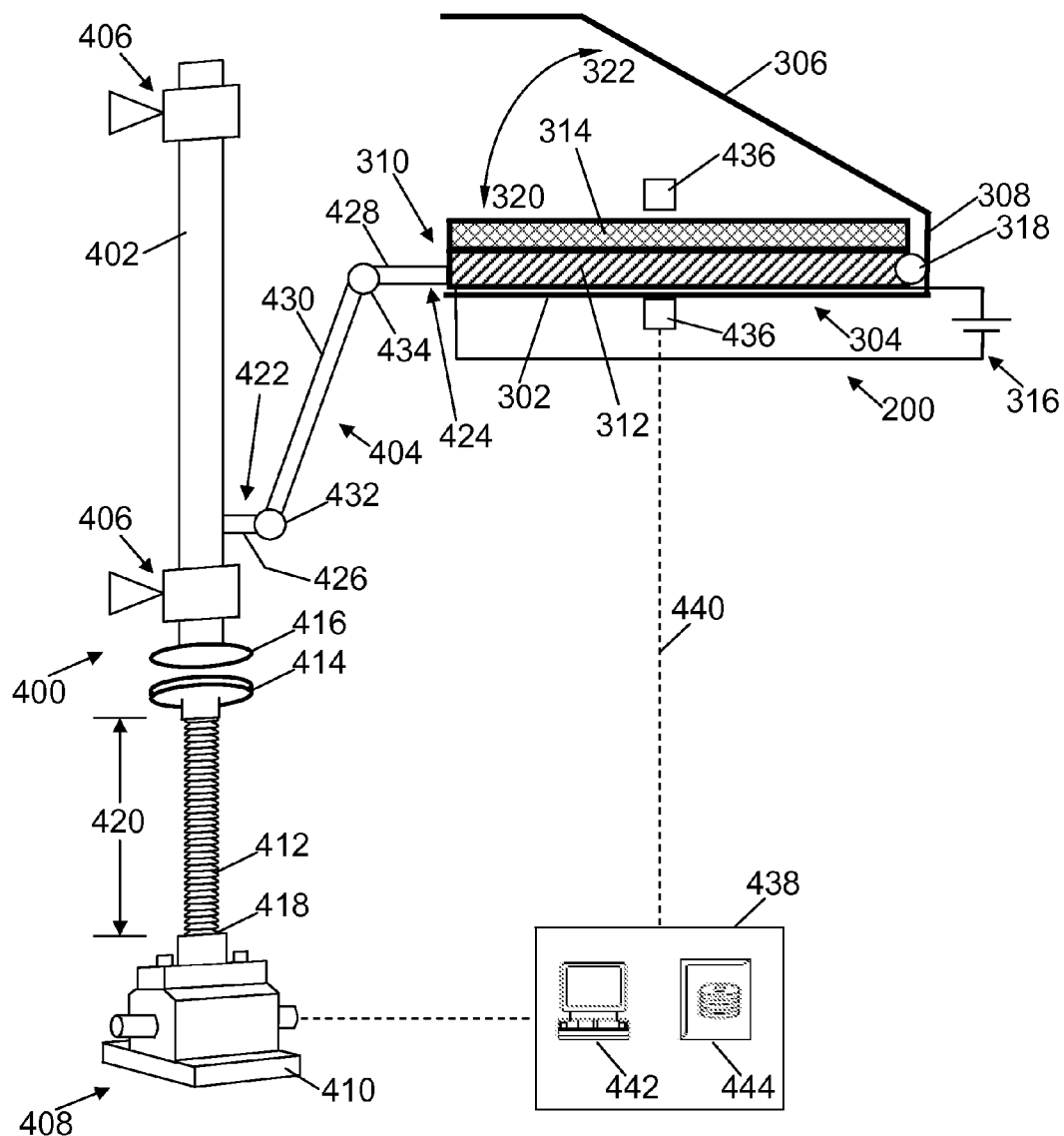
FIG. 3 is a schematic illustration of an exemplary pre-filter assembly and actuating system that may be used with the inlet filter house shown in FIG. 2.

FIG. 3 is a schematic illustration of inlet hood 200. In the exemplary embodiment, inlet hood 200 includes a lower hood member 302 that extends outwardly from outer wall 202 of air filter enclosure 204 such that an inlet 304 is defined by lower hood member 302. In the exemplary embodiment, an upper hood member 306 extends obliquely from an outer portion 308 of base member 302 towards air filter enclosure 204 such that an airflow path is defined by outer portion 308 within inlet hood 200. Alternatively, inlet hood 200 may have any configuration that enables inlet hood 200 to function as described herein.

In the exemplary embodiment, a pre-filter assembly 310 filters airflow channeled through inlet 304 into inlet hood 200. In the exemplary embodiment, pre-filter assembly 310 includes a moisture separator 312 that separates moisture from ambient air flowing across pre-filter assembly 310, a filter medium or coalescing pad 314 that captures and/or removes moisture and particulate matter such as dust and/or debris entrained in ambient air, and an electrical heat tracing circuit 316 that facilitates preventing the formation of ice within pre-filter assembly 310. In the exemplary embodiment, heat tracing circuit 316 is routed between pre-filter assembly 310 and lower hood member 302. Notably, pre-filter assembly 310 may be any combination of moisture separator 312, coalescing pad 314, and/or heat tracing circuit 316.

In the exemplary embodiment, pre-filter assembly 310 is pivotably coupled to inlet hood 200 at a hinge 318 such that pre-filter assembly 310 substantially covers inlet 304. More specifically, in the exemplary embodiment, pre-filter assembly 310 is selectively movable within inlet hood 200 between a first, or operating, position 320, a second, or bypass, position 322, and/or any intermediate positioned between operating position 320 and bypass position 322. In operating position 320, pre-filter assembly 310 substantially covers inlet 304 such that ambient air entering inlet hood 200 is routed through pre-filter assembly 310. In contrast, in bypass position 322, pre-filter assembly 310 only partially covers inlet 304 such that ambient air may enter inlet hood 200 without being channeled through at least a portion of pre-filter assembly 310. In bypass position 322, pre-filter assembly 310 is positioned adjacent and in close proximity to upper hood member 306.

In the exemplary embodiment, an actuating assembly 400 is coupled to pre-filter assembly 310. In the exemplary embodiment, actuating assembly 400 is a mechanical assembly that is configured to selectively position pre-filter assembly 310 between operating position 320 and bypass position 322. In the exemplary embodiment, actuating assembly 400 includes an actuator rod 402, a lever assembly 404, at least one guiding sleeve 406, and an actuator 408.

In the exemplary embodiment, actuator 408 includes a driving motor 410 that is coupled to a threaded bar 412 that includes a first end 414 that is positioned adjacent to an end 416 of actuator rod 402, and a second end 418 that is coupled to driving motor 410. Alternatively, actuator rod 402 may be operatively engaged with driving motor 410. In the exemplary embodiment, driving motor 410 controls a relative position of threaded bar 412. In the exemplary embodiment, during operation, driving motor 410 rotates threaded bar 412 about its longitudinal axis to cause threaded bar 412, and thus pre-filter assembly 310, to move. Alternatively, actuator assembly 400 and/or pre-filter assembly 310 may be moved using other actuating systems, including, for example, pneumatic, hydraulic, and/or electrical systems.

In the exemplary embodiment, guiding sleeve 406 has an inner diameter (not shown) that is sized to enable actuator rod 402 to extend through guiding sleeve 406 such that actuator rod 402 is slidable along its longitudinal axis. In the exemplary embodiment, driving motor 410 actuates actuating assembly 400 to translate actuator rod 402 along its longitudinal axis. More specifically, in the exemplary embodiment, driving motor 410 rotates threaded bar 412 to cause a height 420 of threaded bar 412 above driving motor 410 to be adjusted. For example, as driving motor 410 rotates threaded bar 412 in a first direction, threaded bar 412 is lowered and height 420 decreases, causing actuator rod 402 to translate downward along its longitudinal axis. In contrast, as driving motor 410 rotates in a second direction opposite the first direction, threaded bar 412 is raised and height 420 increases, causing actuator rod 402 to translate upward along its longitudinal axis. In the exemplary embodiment, actuator rod 402 and threaded bar 412 are substantially coaxially aligned.

In the exemplary embodiment, lever assembly 404 is coupled at a first end 422 to actuator rod 402 and at a second end 424 to pre-filter assembly 310. More specifically, in the exemplary embodiment, lever assembly 404 includes a first flange 426 that is coupled to actuator rod 402, a second flange 428 that is coupled to pre-filter assembly 310, and a lever body 430 that is coupled to first flange 426 and to second flange 428 via a respective first hinge 432 and a second hinge 434. In the exemplary embodiment, first hinge 432 and second hinge 434 are rotatable about an axis that is substantially perpendicular to actuator rod 402 and/or threaded bar 412. In the exemplary embodiment, actuation of lever assembly 404 facilitates selectively positioning and/or repositioning of pre-filter assembly 310. More specifically, in the exemplary embodiment, as actuator rod 402 translates downward along its longitudinal axis, lever assembly 404 moves pre-filter assembly 310 towards operating position 320. In contrast, as actuator rod 402 translates upward along its longitudinal axis, lever assembly 404 moves pre-filter assembly 310 towards bypass position 322.

In the exemplary embodiment, at least one sensor 436 is coupled to inlet hood 200 and/or to pre-filter assembly 310. In the exemplary embodiment, sensor 436 monitors operation of gas turbine engine system 100 by detecting at least one operating parameter. More specifically, in the exemplary embodiment, sensor 436 is coupled to pre-filter assembly 310 for sensing at least one of a humidity of ambient air, a temperature of ambient air, a pressure drop in airflow across pre-filter assembly 310, a particulate count of ambient air and/or pre-filter assembly 310, and an air speed at pre-filter assembly 310. For example, a pressure sensor (not shown) may be used to detect ambient air pressure and a temperature sensor (not shown) may be used to detect ambient air temperature at inlet filter house 102 and/or at any other suitable location. As used herein, the term "parameter" refers to a physical property whose value can be used to define an operating condition of gas turbine engine system 100, such as the humidity, the temperature, the pressure, the particulate count, and/or the air speed at a defined location.

In the exemplary embodiment, a controller 438 is coupled to sensor 436 via a communication link 440 that may be implemented in hardware and/or software. In the exemplary embodiment, communication link 440 remotely communicates data signals to and from controller 438 in accordance with a suitable wired and/or wireless communication protocol. For example, such data signals may include signals indicative of operating condition parameters of sensor 436 transmitted to controller 438 and/or various operating command signals communicated by controller 438 to sensor 436.

In the exemplary embodiment, controller 438 includes at least one processor 442 and a memory 444 coupled to processor 442. For example, controller 438 may be a computer system. It should be understood that controller 438 may also include input channels and/or output channels that may include, without limitation, other sensors, computer peripherals associated with an operator interface, a control device, an operator interface monitor, and/or a display.

As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet.

Moreover, in the embodiments described herein, the term "memory" may include, without limitation, a computer-readable medium, such as a random access memory (RAM), and a computer-readable non-volatile medium, such as a flash memory. Alternatively, a floppy disk, a compact disc-read only memory (CD-ROM), a magneto-optical disk (MOD), and/or a digital versatile disc (DVD) may also be used. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, airflow control commands. The execution of sequences of instructions is not limited to any specific combination of hardware circuitry and software instructions.

In the exemplary embodiment, controller 438 executes programs to facilitate control of the operation of gas turbine engine system 100 based on sensor inputs and/or instructions from a human operator. For example, programs executed by controller 438 may include, for example, programs used to determine a configuration of pre-filter assembly 310. In the exemplary embodiment, commands generated by controller 438 can cause sensor 436 to monitor at least one parameter of ambient environment and/or to activate other control settings on gas turbine engine system 100.

In the exemplary embodiment, controller 438 actuates actuating assembly 400 to selectively position pre-filter assembly 310. More specifically, in the exemplary embodiment, controller 438 is configured to actuate driving motor 410 to selectively position pre-filter assembly 310 by moving actuator rod 402 along its longitudinal axis based on at least one parameter detected by sensor 436.

During operation, in the exemplary embodiment, inlet hood 200 channels ambient air into air filter chamber 208. More specifically, in the exemplary embodiment, ambient air is channeled through inlet 304, and, when pre-filter assembly 310 is in operating position 320, the air is channeled through pre-filter assembly 310. In the exemplary embodiment, pre-filter assembly 310 facilitates removing at least some moisture and/or debris entrained in the air entering inlet hood 200. More specifically, in the exemplary embodiment, as ambient air flows through pre-filter assembly 310, moisture separator 312 uses inertial separation to remove droplets and coalescing pad 314 causes moisture contained in ambient air to coalesce into larger droplets. In the exemplary embodiment, the coalesced droplets from coalescing pad 314 are gravity fed into moisture separator 312 prior to being channeled from ambient air.

In the exemplary embodiment, depending on an amount of debris, dust and/or moisture captured, pre-filter assembly 310 may restrict airflow through inlet hood 200, thereby causing an increased loss in air pressure. More specifically, in the exemplary embodiment, the increased loss in air pressure may be caused by an accumulation of dust and/or debris on pre-filter assembly 310 and/or a formation of snow and/or ice on pre-filter assembly 310. In the exemplary embodiment, sensor 436 monitors any suitable parameter including a humidity, a temperature, a pressure, a particulate count, and/or an air speed within or adjacent to inlet hood 200 and, more specifically, to pre-filter assembly 310.

In the exemplary embodiment, when sensor 436 detects a parameter that has a value that is at a predetermined threshold, sensor 436 transmits a signal to controller 438. In the exemplary embodiment, the predetermined threshold may be based on any combination of operating parameters, including, for example, any combination of a predetermined humidity of ambient air, a predetermined temperature of ambient air, a predetermined pressure drop across pre-filter assembly 310, a predetermined particulate count of inlet hood 200 and/or pre-filter assembly 310, and/or a predetermined speed of airflow.

For example, when sensor 436 detects warm ambient air and/or moist ambient air, such as may be prevalent during a summer season, a rainy season, or a foggy season, sensor 436 transmits a first signal to controller 438. More specifically, in the exemplary embodiment, when sensor 436 detects a first temperature at or above approximately 40° F., a first relative humidity at or above approximately 90%, a first pressure drop below approximately 1.5 inches of water column (WC), and/or a particulate count below approximately 10.0 milligrams (mg) per cubic meter in ambient air, sensor 436 transmits the first signal to controller 438. In contrast, when sensor 436 detects freezing conditions, a sandstorm, and/or a dust storm such as may be prevalent during a winter season, a dry season or a windy season, sensor 436 transmits a second signal to controller 438. More specifically, in the exemplary embodiment, when sensor 436 detects a second temperature below approximately 40° F., a second relative humidity below approximately 90%, a second pressure drop at or above approximately 1.5 inches of WC, and/or a particulate count at or above approximately 10.0 mg per cubic meter in ambient air, sensor 436 transmits the second signal to controller 438.

In the exemplary embodiment, controller 438 actuates actuating assembly 400 to move pre-filter assembly 310 based on the parameter detected and the signal(s) transmitted by sensor 436. For example, when controller 438 receives the first signal from sensor 436, controller 438 determines a first command for actuating assembly 400, and when controller 438 receives the second signal from sensor 436, controller 438 determines a second command for actuating assembly 400. In the exemplary embodiment, the first command includes instructions for actuating assembly 400 to move pre-filter assembly 310 towards operating position 320, and the second command includes instructions for actuating assembly 400 to move pre-filter assembly 310 towards bypass position 322. In the exemplary embodiment, controller 438 transmits the determined command to actuating assembly 400 to move pre-filter assembly 310 towards operating position 320 or bypass position 322.

In the exemplary embodiment, when actuating assembly 400 receives the first command, driving motor 410 rotates threaded bar 412 about its longitudinal axis to cause height 420 of threaded bar 412 to be decreased, thus causing actuator rod 402 to translate downwardly along its longitudinal axis such that pre-filter assembly 310 is moved towards operating position 320. In contrast, when actuating assembly 400 receives the second command, driving motor 410 rotates threaded bar 412 about its longitudinal axis to cause height 420 of threaded bar 412 to be increased, thus causing actuator rod 402 to translate upwardly along its longitudinal axis such that pre-filter assembly 310 is moved towards bypass position 322. Moreover, in the exemplary embodiment, in bypass position 322, a user can access pre-filter assembly 310 for cleaning, removal, and/or replacement of pre-filter assembly 310 while turbine engine system 100 remains in operation. After a user cleans pre-filter assembly 310, controller 438 may receive the second signal from a user input device (not shown) to selectively return pre-filter assembly 310 to operating position 320.

In the exemplary embodiment, controller 438 records and/or maintains a parameter matrix in memory 444. In the exemplary embodiment, the parameter matrix may include a plurality of footprints based at least in part on a detected parameter. In the exemplary embodiment, the parameter matrix may facilitate determining an operating command for actuating assembly 400 based at least in part on the plurality of footprints. For example, controller 438 may automatically calibrate and/or adjust an operating command for gas turbine engine system 100 based on at least the detected parameters. As such, in the exemplary embodiment, controller 438 is able to operate actuating assembly 400 based on seasonal patterns for certain parameters such as humidity, temperature, pressure, particulate count, and air speed.

The exemplary methods and systems described herein provide a pre-filtration bypass system that is operable based on ambient conditions. More specifically, the exemplary pre-filtration bypass system described herein facilitates selectively bypassing the filter assembly during operating periods to increase an operating efficiency of the turbine engine. Additionally, in sharp contrast to known filter assemblies, the exemplary embodiments described herein enable the filter assembly to be selectively bypassed without requiring a shutdown of the associated turbine engine. Thus, the exemplary pre-filtration bypass system facilitates reducing a cost of maintaining the gas turbine engine system and, more specifically, the gas turbine engine inlet system.

Exemplary embodiments of systems and methods for the pre-filtration bypass system are described above in detail. The exemplary systems and methods are not limited to the specific embodiments described herein, but rather, components of the systems and/or steps of the methods may be utilized independently and separately from other components and/or steps described herein. For example, the exemplary embodiments may be used in combination with other systems and methods, and are not limited to practice with only the gas turbine engine system as described herein. Rather, the exemplary embodiments can be implemented and utilized in connection with many other combustion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for assembling an inlet filter house for use with a turbine engine, said method comprising:
coupling an inlet hood within an inlet of the turbine engine, wherein the inlet hood includes a filter assembly that is selectively positionable between an operating position and a bypass position;

coupling an actuating assembly to the filter assembly to selectively position the filter assembly;
coupling at least one sensor to detect at least one operating parameter within the turbine engine; and
coupling a controller to the sensor to selectively actuate the actuating assembly based on the at least one operating parameter.

2. A method in accordance with claim 1, wherein coupling a controller to the sensor further comprises providing a memory area and a processor coupled to the memory area, wherein the processor, when executed, is configured to direct the controller to:
receive the at least one operating parameter from the sensor;
determine a desired position for the filter assembly based on the at least one operating parameter received from the sensor; and
transmit a signal to the actuating assembly to move the filter assembly toward the position determined by the controller.

3. A method in accordance with claim 2, wherein providing a memory area and a processor coupled to the memory area further comprises programming the processor to direct the controller to maintain a parameter matrix, including a plurality of footprints, based at least in part on the at least one operating parameter.

4. A method in accordance with claim 1, wherein coupling an actuating assembly to the filter assembly further comprises:
extending an actuator rod through at least one guiding sleeve; and
coupling the actuator rod to the filter assembly.

5. A method in accordance with claim 4, wherein coupling an actuating assembly to the filter assembly further comprises providing an actuator, wherein the controller translates the actuator rod through the guiding sleeve.

6. A method in accordance with claim 1, wherein coupling at least one sensor further comprises providing a sensor to detect at least one of a humidity, a temperature, a pressure, a particulate count, and an air speed.

7. An inlet filter house for use with a turbine engine, said inlet filter house comprising:
an inlet hood comprising a filter assembly selectively positionable between an operating position and a bypass position;
an actuating assembly coupled to said filter assembly to selectively position the filter assembly;
a sensor configured to detect at least one operating parameter; and
a controller coupled to said sensor for actuating said actuating assembly based on the at least one operating parameter.

8. An inlet filter house in accordance with claim 7, wherein said controller comprises a memory area and a processor coupled to said memory area, said processor programmed to cause said controller to:
receive the at least one operating parameter from said sensor;
determine a desired position for said filter assembly based on the at least one operating parameter received from said sensor; and
transmit a signal to said actuating assembly to move said filter assembly toward the position determined by said controller.

9. An inlet filter house in accordance with claim 8, wherein said processor is further programmed to cause said controller to maintain a parameter matrix, including a plurality of footprints, based at least in part on the at least one operating parameter.

10. An inlet filter house in accordance with claim 7, wherein said actuating assembly comprises at least one guiding sleeve and an actuator rod extending through said at least one guiding sleeve, wherein said actuator rod is coupled to said filter assembly.

11. An inlet filter house in accordance with claim 10, wherein said actuating assembly further comprises an actuator, wherein said controller is configured to actuate the actuator to translate said actuator rod through said guiding sleeve.

12. An inlet filter house in accordance with claim 7, wherein said filter assembly comprises a moisture separator, a filter medium, and a heat tracing circuit.

13. An inlet filter house in accordance with claim 7, wherein the at least one operating parameter includes at least one of a humidity, a temperature, a pressure, a particulate count, and an air speed.

14. A turbine engine comprising:
an inlet duct;
an inlet filter house coupled to said inlet duct, said inlet filter house comprising a filter assembly selectively positionable between an operating position and a bypass position;
an actuating assembly coupled to said filter assembly to selectively position said filter assembly;
a sensor configured to detect at least one operating parameter; and
a controller coupled to said sensor for actuating said actuating assembly based on the at least one operating parameter.

15. A turbine engine in accordance with claim 14, wherein said controller comprises a memory area and a processor coupled to said memory area, said processor programmed to cause said controller to:
receive the at least one operating parameter from said sensor;
determine a desired position for said filter assembly based on the at least one operating parameter received from said sensor; and
transmit a signal to said actuating assembly to move said filter assembly toward the position determined by said controller.

16. A turbine engine in accordance with claim 15, wherein said processor is further programmed to cause said controller to maintain a parameter matrix, including a plurality of footprints, based at least in part on the at least one operating parameter.

17. A turbine engine in accordance with claim 14, wherein said actuating assembly comprises at least one guiding sleeve and an actuator rod extending through said at least one guiding sleeve, wherein said actuator rod is coupled to said filter assembly.

18. An inlet filter house in accordance with claim 17, wherein said actuating assembly further comprises an actuator, wherein said controller is configured to actuate the actuator to translate said actuator rod through said guiding sleeve.

19. A turbine engine in accordance with claim 14, wherein said filter assembly comprises a moisture separator, a filter medium, and a heat tracing circuit.

20. A turbine engine in accordance with claim 14, wherein the at least one operating parameter includes at least one of a humidity, a temperature, a pressure, a particulate count, and an air speed.

* * * * *